United States Patent
Li

(10) Patent No.: US 8,391,303 B2
(45) Date of Patent: Mar. 5, 2013

(54) BORDER GATEWAY PROTOCOL (BGP) GROUPED ROUTE WITHDRAWALS

(75) Inventor: Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 367 days.

(21) Appl. No.: 12/753,941

(22) Filed: Apr. 5, 2010

(65) Prior Publication Data

US 2010/0265956 A1     Oct. 21, 2010

Related U.S. Application Data

(60) Provisional application No. 61/169,920, filed on Apr. 16, 2009.

(51) Int. Cl.
*H04L 12/28* (2006.01)

(52) U.S. Cl. .................. 370/401; 370/254; 370/392

(58) Field of Classification Search .................. None
See application file for complete search history.

(56) References Cited

U.S. PATENT DOCUMENTS

| | | | | |
|---|---|---|---|---|
| 6,392,997 B1* | 5/2002 | Chen | | 370/252 |
| 7,359,393 B1* | 4/2008 | Nalawade et al. | | 370/401 |
| 7,457,251 B1* | 11/2008 | Chen | | 370/252 |
| 7,590,074 B1* | 9/2009 | Dondeti et al. | | 370/254 |
| 7,675,912 B1* | 3/2010 | Ward et al. | | 370/392 |
| 7,739,404 B2* | 6/2010 | Li | | 709/242 |
| 7,792,099 B2* | 9/2010 | Yasukawa et al. | | 370/386 |
| 7,889,740 B2* | 2/2011 | Ogishi | | 370/392 |
| 8,077,713 B2* | 12/2011 | Vasseur et al. | | 370/390 |
| 8,161,152 B2* | 4/2012 | Ogielski et al. | | 709/224 |
| 2006/0174035 A1* | 8/2006 | Tufail | | 709/239 |
| 2007/0258376 A1* | 11/2007 | Li | | 370/238 |
| 2008/0025333 A1* | 1/2008 | Dubois et al. | | 370/410 |
| 2010/0220736 A1* | 9/2010 | Mohapatra et al. | | 370/401 |

OTHER PUBLICATIONS

Y. Rekhter, T. Li, and S. Hares (eds), A Border Gateway Protocol 4 (BGP-4), RFC 4271, Jan. 2006.
E. Rosen, Y. Rekhter, BGP/MPLS IP Virtual Private Networks (VPNs), RFC 4364, Feb. 2006.
T. Bates, et al., "Multiprotocol Extensions for BGP-4," RFC 4760, Jan. 2007.
Halabi, et al., "Border Gateway Protocol Version 4," Chapter 5—Internet Routing Architectures, Second Edition, Cisco Press, 2001, pp. 111-133.

* cited by examiner

*Primary Examiner* — Michael J Moore, Jr.
(74) *Attorney, Agent, or Firm* — Conley Rose, P.C.; Grant Rodolph; Clint S. Wilkins

(57) ABSTRACT

An apparatus comprising: a first Border Gateway Protocol (BGP) device configured to communicate with a second BGP device and implement grouped route withdrawals with the second BGP device. A method comprising: announcing, by a BGP speaker, a plurality of grouped routes, and withdrawing, by the BGP speaker, a plurality of previously announced grouped routes.

15 Claims, 9 Drawing Sheets

BORDER GATEWAY PROTOCOL (BGP) GROUPED ROUTE WITHDRAWALS

CROSS-REFERENCE TO RELATED APPLICATIONS

The present application claims priority to U.S. Provisional Patent Application Ser. No. 61/169,920 filed Apr. 16, 2009 by Renwei Li and entitled "Method For Group-Based Route Withdrawals in the Border Gateway Protocol BGP-4 and Its Multiprotocol Extensions," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

One major use of the Border Gateway Protocol (BGP) protocol is to establish connections between inter-connected different autonomous systems (ASs) to exchange routing information. When a BGP speaker receives routes from a peer in a different autonomous system over an external BGP connection, the BGP speaker will generally redistribute the received routes to all its internal BGP peers in the same AS over internal BGP connections, or redistribute the received routes to an internal BGP peer which acts as Route Reflector (RR). When the external BGP peer is shut down, the BGP peer needs to withdraw all the previously redistributed routes from its internal BGP peers. The route withdrawal is performed by the following two steps in sequence: (1) the BGP speaker encodes all the withdrawn routes in the UPDATE messages, and then sends them to all other internal BGP peers; and (2) all the other internal BGP peer decodes all the withdrawn routes, and then removes the routes one-by-one from their BGP routing table. In a BGP core router, there may be hundreds of thousands of routes to be withdrawn, and thus the UPDATE message may contain hundreds of thousands of withdrawn routes, which will require much processing in encoding, decoding, and processing of the withdrawn routes.

Another major use of the BGP protocol is to redistribute and exchange multiprotocol routing information by its multiprotocol extensions. In particular, the BGP multiprotocol extension can be used to exchange IPv4 virtual private network (VPN) routing information among different sites. When a provider edge (PE) router receives routes from a CE (CE) router over its attachment circuit, the PE router needs to redistribute to other PE routers which connect to other CE routers for the same customer VPN. When such a CE router is shut down, the corresponding PE router needs to withdraw the previously announced routes from all other PE routers which serve the same VPN. All the withdrawn routes need to be encoded in the UPDATE message by the sender, then decoded and processed in the UPDATE message by the receiver.

SUMMARY

In one aspect, the disclosure includes an apparatus comprising: a first BGP device configured to communicate with a second BGP device and implement grouped route withdrawals with the second BGP device.

In another aspect, the disclosure includes a method comprising: announcing, by a BGP speaker, a plurality of grouped routes, and withdrawing, by the BGP speaker, a plurality of previously announced grouped routes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
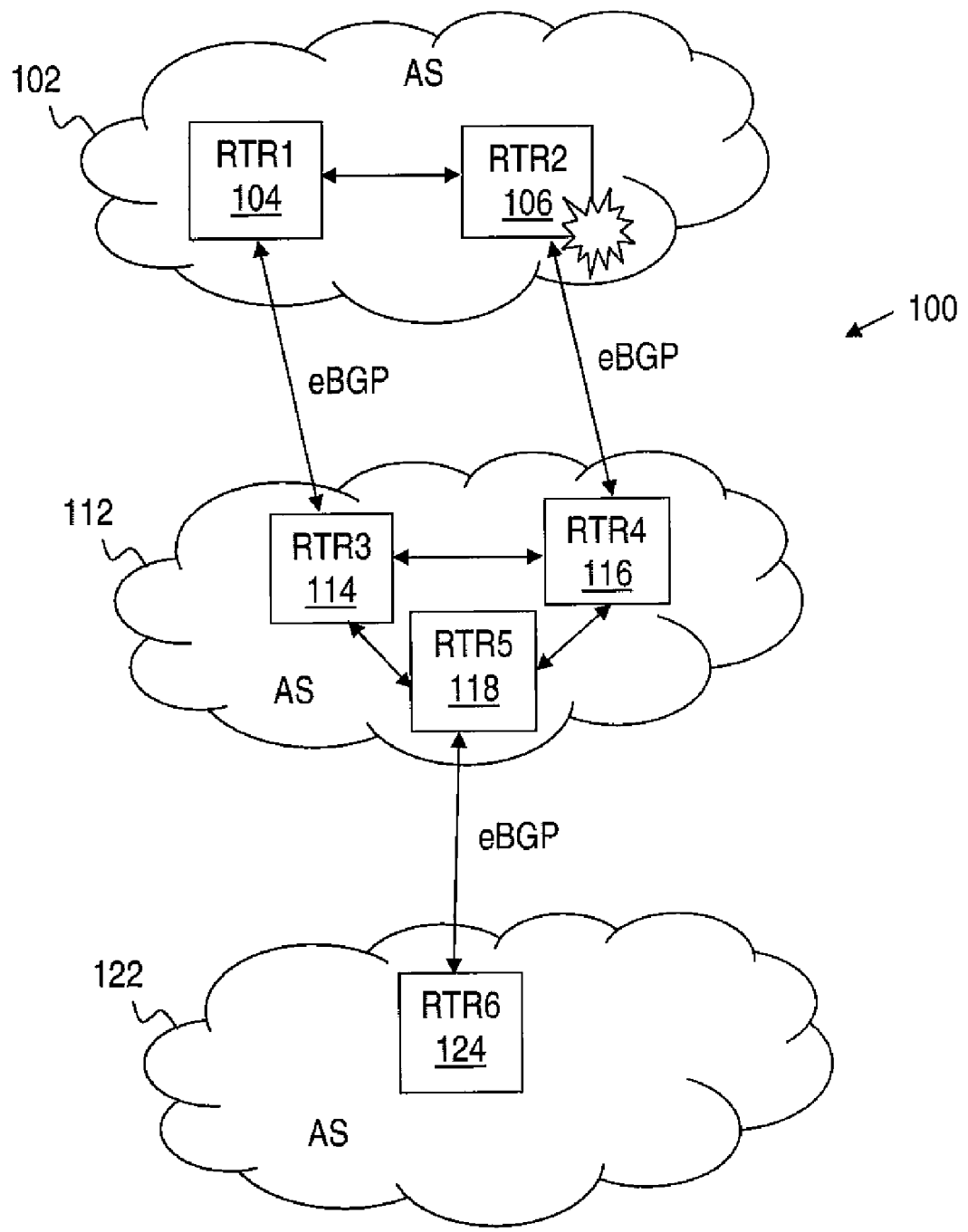
FIG. 1 illustrates a communication system in accordance with an embodiment of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Internet is built by inter-connecting different ASs. As used herein, an "autonomous system" may refer to a set of routers that has a single routing policy and is run under a single technical administration. To the outside world, each AS is viewed as a single entity identified with a number, assigned by the Internet Registry or a service provider in the case of private ASs, referred to an AS number. For communications, ASs may implement the BGP.

Embodiments disclosed herein are related to methods and systems that enable grouped route withdrawals in BGP systems. For example, BGP protocol extensions may be used to announce grouped routes and withdraw grouped routes. In at least some embodiments, BGP peers negotiate whether to implement grouped route withdrawals. If negotiations are successful, a sender BGP peer announces grouped routes to at least one receiver BGP peer in accordance with the negotiations. The announcement may include a group identifier and all routes associated with the group identifier. The sender BGP peer is later able to withdraw grouped routes by transmitting a withdraw request and the group identifier previously announced to the receiver BGP peers.

In addition to negotiating use of BGP grouped routes, each BGP peer is able to selectively enable and disable grouped route withdrawal. If two BGP peers agree to support grouped route withdrawal, a BGP speaker adds a new path attribute to routes so that the routes are tagged by a group identifier or a label. To withdraw grouped routes, a BGP speaker sends an UPDATE message which contains a path attribute to indicate that all routes with a specified tag will be withdrawn. In this manner, the BGP speaker does not have to encode all withdrawn routes. Instead, the BGP speaker simply encodes a previously announced tag or a group identifier. When a BGP speaker receives such an UPDATE message containing a tag, the BGP speaker will remove all the routes with that tag. In this manner, the overhead of encoding, decoding and processing of withdrawn routes is greatly reduced and thus the scalability is enhanced. The techniques disclosed herein may be applied, for example, to BGP-4 and its multiprotocol extensions.

In at least some embodiments, the BGP protocol is extended with a new grouped route withdrawal capability (e.g., "GROUP-WITHDRAWAL-CAPABLE") signaled in OPEN messages to indicate that a BGP speaker supports tag-based withdrawal of routes. In BGP protocol extensions, a new grouped route withdrawal capability (e.g., "MP-GROUP-WITHDRAWAL-CAPABLE") is signaled in OPEN messages to indicate that a BGP speaker supports tag-based withdrawal of routes in multiprotocol extensions of BGP. The new capability MP-GROUP-WITHDRAWAL-CAPABLE does not have to be the same as the capability GROUP-WITHDRAWAL-CAPABLE.

Further, a route update message can include a new extended community identifier (e.g., "RECEIVED-FROM" or "GROUPED-BY") to indicate the route belongs to a particular community, and later may be withdrawn using the extended community identifier. The new extended community identifier may be an IP address of a BGP speaker which announces the route from an autonomous system to another autonomous system. A path attribute (e.g., GROUP-UN-REACH-NLRI) is added to route UPDATE messages, where the new attribute includes a group tag. The new path attribute is able to indicate removal of all routes associated with the group tag.

The new extended community identifier may be any length in bits or bytes. After a BGP speaker receives a route from a peer, the BGP speaker can tag the route by using the extended community identifier and then redistribute the tagged route to other BGP peers. The tag can be any identifier and enables the BGP speaker to group routes together for the purpose of withdrawals. After an external BGP peer is shut down, the BGP speaker will withdraw all the routes previously received from the peer. Then the BGP speaker will send a BGP UPDATE message to all its internal BGP peers. The UPDATE message can include the GROUP-UNREACH-NLRI path attribute to remove all the routes tagged with a group identifier.

In some networks, a Route Reflector can also use the tagging mechanism described herein to withdraw routes. In such case, all the peers are internal BGP peers. After an internal BGP peer receives an UPDATE message which contains the GROUP-UNREACH-NLRI path attribute, the BGP peer will remove all its routes with the tag previously received from the BGP speaker. After the routes are removed, the BGP peer will recalculate the Best Path, and then operate in accordance with standard BGP.

In Multi-Protocol BGP (MP-BGP), a new path attribute (e.g., "MP-GROUPREACH-NLRI") may be added to tag multiprotocol reachable network layer reachability information with a group identifier. Further, a new path attribute (e.g., "MP-GROUP-UNREACH-NLRI") is added to indicate removal of all routes tagged with a previously announced group identifier. In the case of Layer-3 VPN, a Layer-3 VPN route is encoded with the path attribute MP-GROUP-REACH-NLRI such that the address of the corresponding CE can be used as the group identifier. When a CE router is shut down, the MP-GROUP-UNREACH-NLRI path attribute is sent to other PE routers from the PE router which directly connects to the affected CE. When other PE routers receive a MP-GROUP-UNREACH-NLRI path attribute, these other PE routes remove all VPN routes associated with the tag contained in the MP-GROUP-UNREACH-NLRI path attribute.

FIG. 1 illustrates a communication system 100 in accordance with an embodiment of the disclosure. In FIG. 1, routing information is exchanged via an exterior gateway protocol such as BGP. As shown, the communication system 100 comprises three ASs 102, 112, 122. The BGP sessions between routers (RTRs) in different ASs are called external BGP (eBGP) sessions/connections, while the BGP sessions between RTRs within the same AS are called internal BGP (iBGP) sessions/connections. In FIG. 1, the BGP sessions between RTR1 104 and RTR3 114, between RTR2 106 and RTR4 116, and/or between RTR5 118 and RTR6 124 are all eBGP sessions. Meanwhile, the BGP sessions between RTR1 104 and RTR2 106, between RTR3 114 and RTR4 116, between RTR3 114 and RTR5 118, and/or between RTR4 116 and RTR5 118 are all iBGP sessions.

In BGP, a finite state machine is maintained which transits from one state to another on sending or receiving a BGP message. Also, four types of messages are specified for BGP Version 4: OPEN, UPDATE, NOTIFICATION, and KEEPALIVE. An OPEN message establishes a BGP session. In accordance with some embodiments, an OPEN message includes its version, autonomous system number, hold timer, and some optional parameters. In particular, an OPEN message may optionally contain BGP Capabilities. Thus, if a BGP speaker determines that a peer supports a given capability, the speaker can use the capability with the peer. On the other hand, a BGP speaker may determine that a peer does not support capability negotiation if, in response to an OPEN message, the speaker receives a NOTIFICATION message. In such case, the BGP speaker will attempt to re-establish a connection with the peer without sending the optional Capability parameter.

Figure 2:
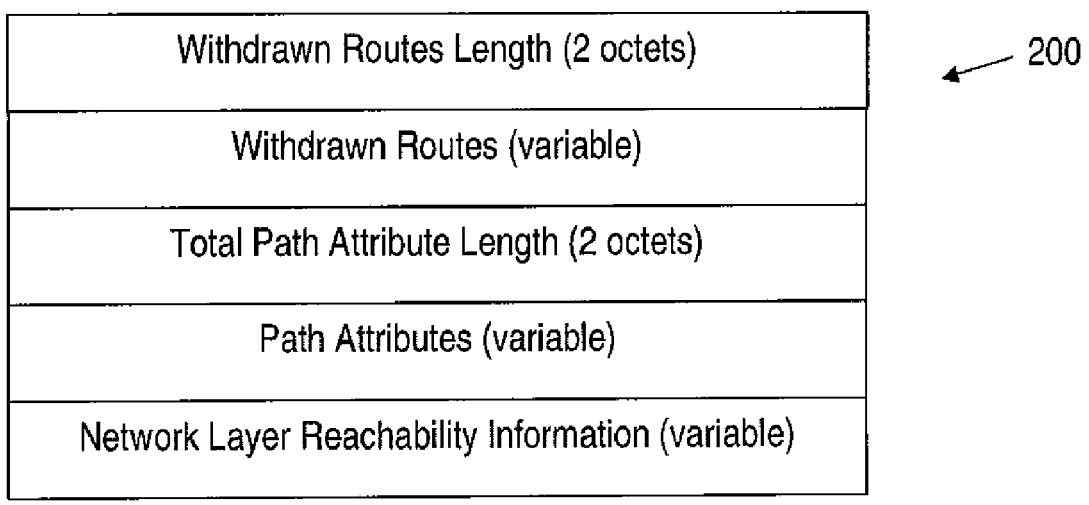
FIG. 2 illustrates an UPDATE message in accordance with an embodiment of the disclosure.

After a BGP session is established, the UPDATE and/or KEEPALIVE messages are selectively exchanged between session participants. Whenever an error is detected, a NOTIFICATION message is sent and the connection is closed. UPDATE messages are central to BGP and contain all the necessary information that BGP uses to construct a loop-free forwarding path. The three basic blocks of an UPDATE message include Network Layer Reachability Information (NLRI), path attributes, and withdrawn (unfeasible) routes. FIG. 2 illustrates an UPDATE message 200 in accordance with an embodiment of the disclosure. As shown, the UPDATE message 200 comprises a withdrawn routes length field (2 octets), a withdrawn routes field (variable length), a total path attribute length field (2 octets), a path attributes field (variable length), and a NLRI field (2 octets).

The NLRI field is encoded as one or more 2-tuples of the form <Length, Prefix>, where the Length parameter indicates the length in bits of the IP address prefix and the Prefix parameter indicates an IP address prefix. For example, an NLRI field with the value <16, 192.200.0.0> indicates network reachability information for the route 192.200.0.0/16. The path attributes field comprises a set of parameters used to keep track of route-specific information such as ORIGIN, AS-PATH, NEXT-HOP, MULTI-EXIT-DISC, LOCAL-PREF, and so on.

The withdrawn routes field provides a list of unfeasible routes that are no longer reachable and need to be withdrawn/removed from the BGP routing table. The withdrawn routes have the same format as the NLRI field (e.g., <Length, Prefix>, where the Length parameter is an IP address prefix length in bits and the Prefix parameter is an IP address prefix. If the withdrawn routes field contain <16, 192.200.0.0>, the route 192.200.0.0/16 will be removed from the BGP routing table by the receiver of the UPDATE message. If 1000 routes need to be removed, there will be 1000 2-tuples (e.g., <Length-1, Prefix-1>; <Length-2, Prefix-2>; . . . <Length-1000, Prefix-1000>).

The disclosed embodiments enable transmission and utilization of withdrawn routes information. In some embodiments, after a BGP speaker receives an UPDATE message, the received withdrawn routes information and NLRI is parsed and processed one by one. More specifically, a withdrawn routes field is parsed to obtain the 2-tuple of the form <Length, Prefix> one by one, and then remove the indicated routes from BGP incoming routing table one by one.

Figure 3:
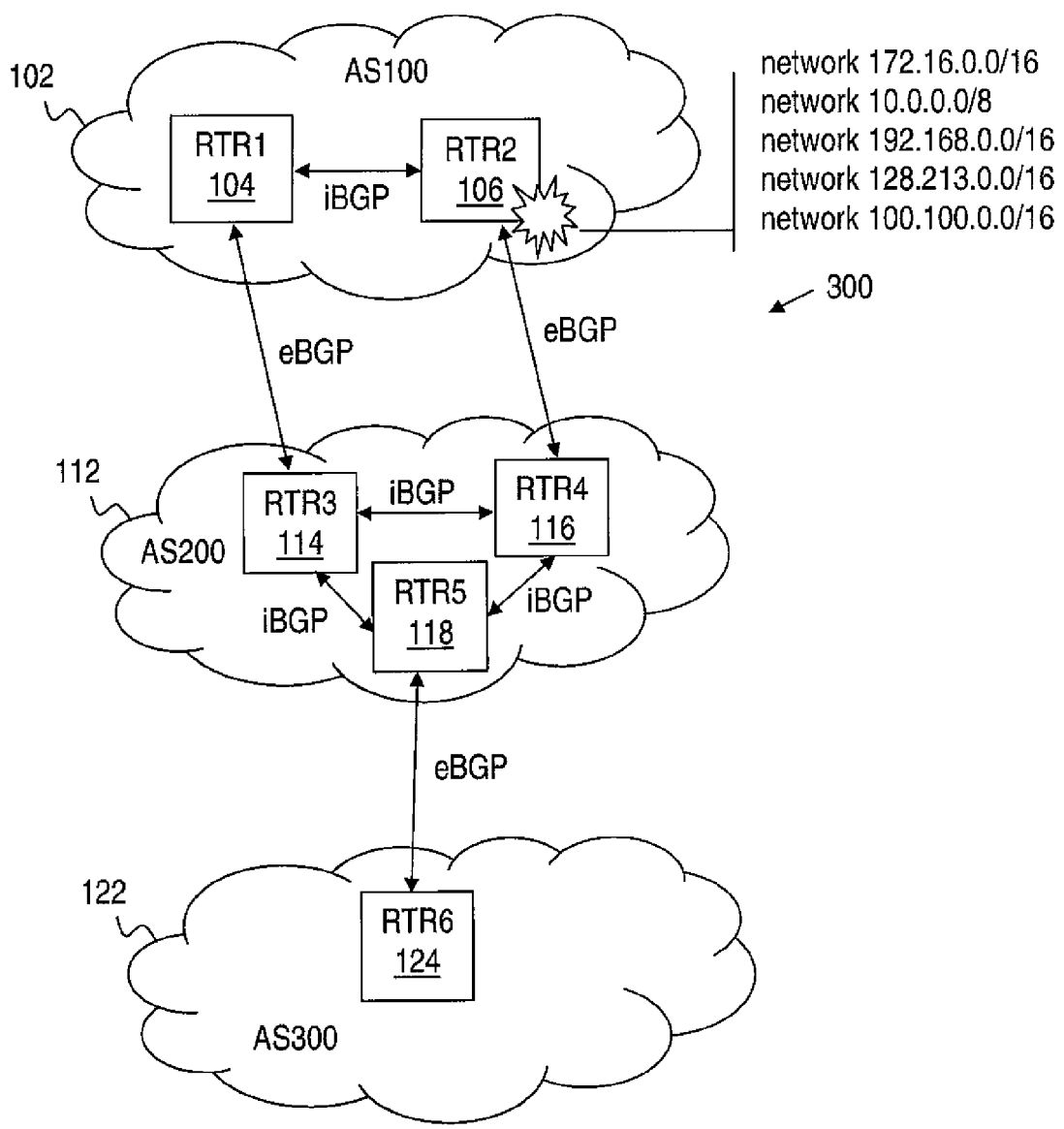
FIG. 3 illustrates BGP Route Updates for the communication system of FIG. 1 in accordance with an embodiment of the disclosure.

FIG. 3 illustrates BGP Route Updates for the communication system 100 of FIG. 1 in accordance with an embodiment of the disclosure. In FIG. 3, an example is shown where RTR2 106 and RTR4 116 form an external BGP session. After the session is established, RTR2 106 sends one or more BGP UPDATE messages to RTR4 116 to announce the routes: network 172.16.0.0/16, network 10.0.0.0/8, network 192.168.0.0/16, network 128.213.0.0/16, and network 100.100.0.0/16. After RTR4 116 receives these routes from RTR2 106, BGP causes the routes to be stored in a BGP IN-TABLE (Adj-RIB-In).

Figure 4:
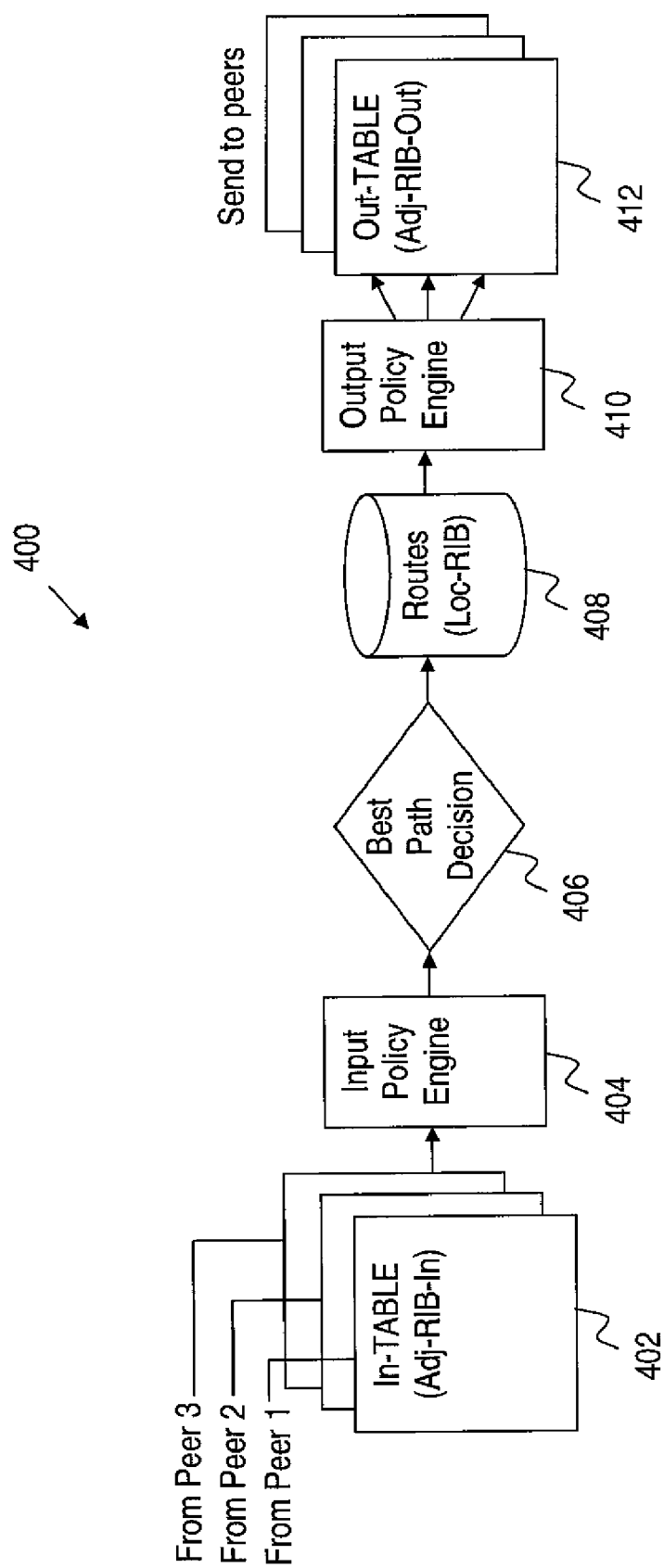
FIG. 4 illustrates a BGP process in accordance with an embodiment of the disclosure.

FIG. 4 illustrates a BGP process 400 in accordance with an embodiment of the disclosure. As shown, the BGP process 400 comprises receiving routes from peers and storing the received routes in a BGP IN-TABLE (Adj-RIB-In) 402. The Input Policy Engine 404 filters the routes and/or manipulates the path attributes of the routes. Thereafter, the Best Path Decision block 406 decides which routes will be used by the router. The routes from the Best Path Decision block 406 are stored in a local routing table (Loc-RIB) 408. The Output Policy Engine 410 filters the routes and/or manipulates routes in the local routing table 408 and stores the result in the Out-TABLE (Adj-RIB-Out) 412. As needed, the routes in the Out-Table 412 are advertised to other peers.

In at least some embodiments, no BGP policy is configured for the BGP process 400. In such case, all received routes stored in the In-TABLE 402 will be processed by the Best Path Decision block 406. If a route is selected as the best path to the corresponding destination, the route is stored in the local routing table 408. As no output policy is configured, the routes in the local routing table 408 are provided to the Out-Table 412 and sent to all the peers.

Returning to the previous example, after the router RTR4 116 receives the five routes (e.g., 172.16.0.0/16; 10.0.0.0/8; 192.168.0.0/16; 128.213.0.0/16; 100.100.0.0/16) from RTR2 106, the received routes are stored in the In-TABLE 402. If the received routes are selected as the best path by the Best Path Decision block 406, then RTR4 116 will send all five routes to its peers: RTR3 114 and RTR5 118. Then, RTR3 114 and RTR5 118 will each store the received routes in an In-TABLE corresponding to RTR4 116.

If RTR2 106 is shut down, various actions or events will occur. In at least some embodiments, in response to RTR2 106 being shut down, RTR4 116 will remove the routes (e.g., 172.16.0.0/16; 10.0.0.0/8; 192.168.0.0/16; 128.213.0.0/16; 100.100.0.0/16) previously received from RTR2 106 from its corresponding In-TABLE. Further, RTR4 116 will remove the routes previously received from RTR2 106 from its local routing table 408. Further, RTR4 116 will remove the routes previously received from RTR2 106 from the Out-TABLES corresponding to RTR3 114 and RTR5 118. Further, RTR4 116 will send an UPDATE message to RTR3 114 and RTR5 118 to withdraw the routes previously received from RTR2 106. These routes (e.g., 172.16.0.0/16; 10.0.0.0/8; 192.168.0.0/16; 128.213.0.0/16; 100.100.0.0/16) will be encoded one-by-one as withdrawn routes in the UPDATE messages. Further, RTR4 116 will send an UPDATE message to RTR3 114 and RTR5 118 to withdraw the five routes. The five routes will be encoded one-by-one as withdrawn routes in the UPDATE messages sent to RTR3 114 and RTR5 118. Further, RTR3 114 will parse the received UPDATE message from RTR4 116 and process the five withdrawn routes one-by-one. Likewise, RTR5 118 will parse the UPDATE message received from RTR4 116 and process the five withdrawn routes one-by-one.

In the above example, it should be noted that RTR4 116 needs to encode every withdrawn route in the UPDATE message. Although there are only five routes given in the above example, in practice there may be a few hundred thousand withdrawn routes. For example, a core router may have approximately 300,000 BGP routes. If there are too many withdrawn routes, the size of the corresponding UPDATE message may likewise be too large. In such case, several smaller UPDATE messages may be sent instead of one large UPDATE message. However, if several UPDATES messages are sent, some of the UPDATE messages may arrive later than others, which results in more complex processing of the UPDATE messages. Accordingly, if possible, one UPDATE message is preferred. Regardless of the number of UPDATE messages, when RTR3 114 or RTR5 118 processes an UPDATE message, the withdrawn routes need to be decoded one-by-one, and then withdrawn one-by-one.

Embodiments disclosed herein utilize grouped route withdrawals to reduce processing overhead of withdrawing routes. For example, if grouped route withdrawal is applied to the previous case when RTR2 106 is shut down, the processing overhead of withdrawing routes is reduced. With grouped route withdrawals, RTR4 116 receives the five routes mentioned previously from RTR2 106, and then announces these routes to RTR3 114 and RTR5 118 by tagging the five routes with an extended BGP community identifier (e.g., "Received-From-AS100-RTR2"). In some embodiments, routers such as RTR4 116 may optionally tag all routes received from the same peer with the same extended community identifier. After RTR2 106 is shut down, RTR4 116 needs to remove all the previously received routes from RTR2 106, and RTR4 116 needs to inform RTR3 114 and RTR5 118 to remove the same routes. Instead of sending an UPDATE message to encode all the withdrawn routes, RTR4 116 sends an UPDATE message which encodes a group withdrawal attribute. The group withdrawal attribute includes, for example, the community identifier (e.g., Received-From-AS100-RTR2) described previously. Thus, no matter how many routes were initially announced by RTR2 106, RTR4 116 just needs to encode a single attribute in the UPDATE message. Instead of processing hundreds, or even thousands of withdrawn routes, RTR3

114 and RTR5 118 only need to process a single group withdrawal attribute. In this manner, the processing overhead for encoding numerous (e.g., thousands) withdrawn routes in RTR4 116 and for decoding numerous (e.g., thousands) withdrawn routes in RTR3 114 and RTR5 118 is greatly reduced. In order for two BGP speakers to understand each other and support such a wildcard or group route withdrawal, the BGP protocol is extended by adding new capabilities in its OPEN message in addition to the above mentioned extended community identifier.

As an example, when RTR4 116 establishes a session with RTR3 114, a new grouped route withdrawal capability (e.g., "Group-Withdrawal-Capable") is encoded in the OPEN message. If the receiving router does not understand the encoded grouped route withdrawal capability or chooses not to participate in grouped route withdrawal, the sending router is notified and a session is set up without the grouped route withdrawal capability. RTR4 116 may similarly establish a session with RTR5 118 (with or without grouped route withdrawal capability). The grouped route withdrawal capability can be enabled or disabled by a user configuration command in the implementation. Assuming that the two sides support the Group-Withdrawal-Capable capability, after RTR4 116 receives the five routes from RTR2 106, RTR4 116 will announce these routes to its peers RTR3 114 and RTR5 118 using UPDATE messages. In the UPDATE messages, RTR4 116 tags the routes with a path attribute or extended community identifier (e.g., "RECEIVED-FROM" or "GROUPED-BY") to indicate that a route belongs to a community (group) represented by the new path attribute. The new path attribute may be, for example, an IPv4/IPv6 address from which the route is received. In the example given, the new path attribute is the IP address of RTR2 106 for the five routes received from RTR2 106.

When RTR2 106 is shut down, RTR4 116 needs to inform RTR3 114 and RTR5 118 that the five routes are withdrawn. Instead of encoding all the five routes in an UPDATE message, RTR4 116 will add a new path attribute (e.g., "GROUP-UNREACH-NLRI"), which contains the previously sent attribute value (e.g., "RECEIVED-FROM" or "GROUPED-BY") to indicate that all routes with the tag should be withdrawn.

In summary, a grouped route withdrawal capability may be encoded in an OPEN message as an optional parameter. Further, an extended community identifier (e.g., "GROUPED-BY") may be encoded as an optional path attribute in UPDATE messages. Further, a path attribute may be encoded with a group tag. For example, a path attribute field may take the following form.

Attribute Type (GROUPED-BY)|GROUP-TAG

The above path attribute includes an Attribute Type field and a GROUP-TAG field. The Attribute Type field identifies the path attribute as a GROUPED-BY extended community identifier. Meanwhile, the GROUP-TAG field may be an IP address associated with the router from which the routes are received. The number of bits (e.g., the size) of the path attribute may vary.

Further, a GROUP-UNREACH-NLRI path attribute may be encoded as an optional path attribute in an UPDATE message and will encode a group tag inside. For example, the GROUP-UNREACH-NLRI path attribute may have the following form.

Attribute Type (GROUP-UNREACH-NLRI)|GROUP-TAG

Figure 5:
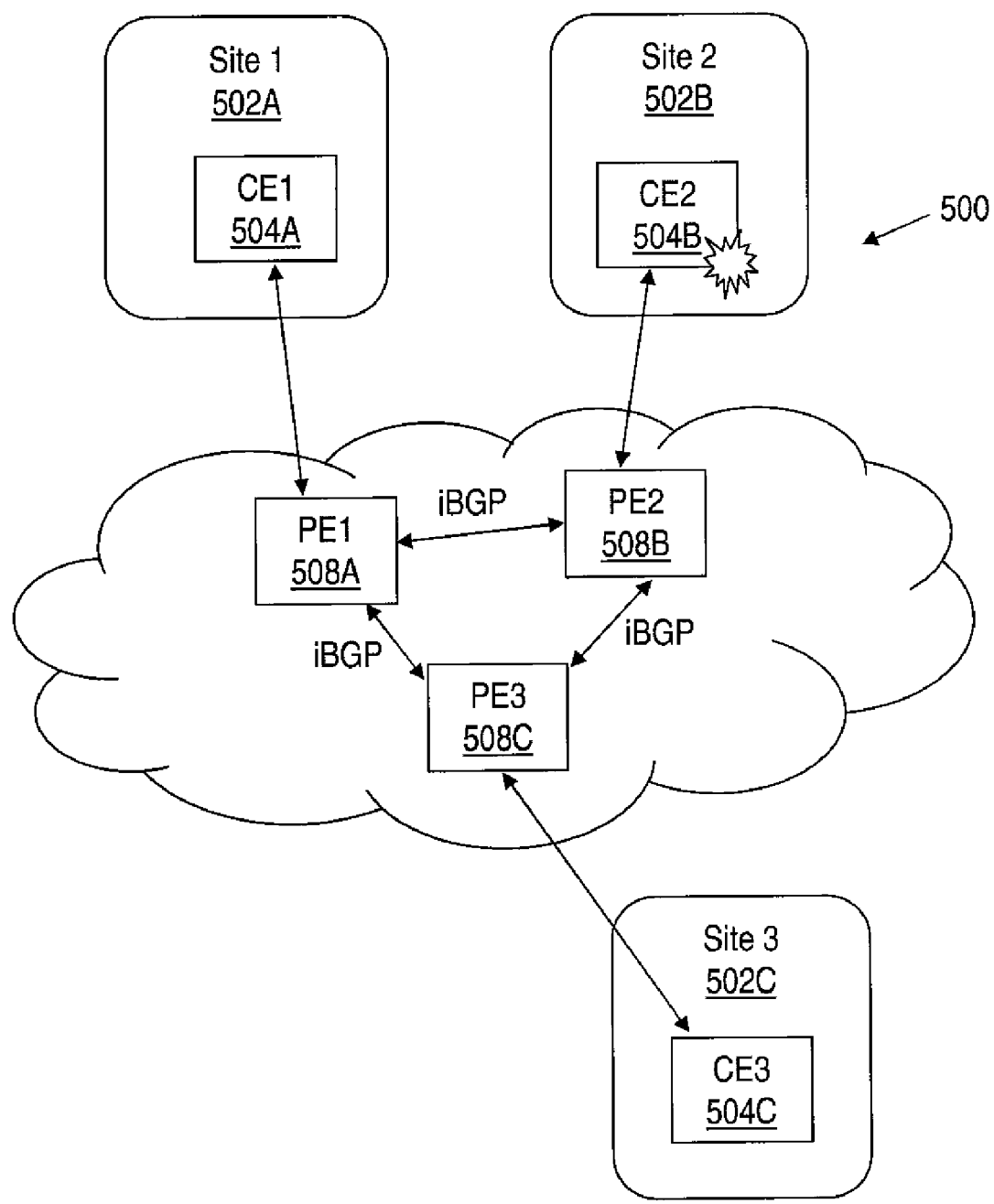
FIG. 5 illustrates an Open System Interconnection (OSI) Layer-3 VPN of three sites in accordance with an embodiment of the disclosure.

Although not limited thereto, in accordance with at least some embodiments, multiprotocol extensions to BGP are applied to BGP/MPLS IP VPNs. FIG. 5 illustrates a Layer-3 VPN 500 of three sites 502A-502C in accordance with an embodiment of the disclosure. In FIG. 5, each site 502A-502C is a branch network of a corporate entity. Each customer router CE 504A-504C communicates the routing information on its site to a corresponding provider router 508A-508C. The BGP multiprotocol extension enables BGP to carry routes from different address families. The VPN routes are encoded by using the so-called VPN-Internet Protocol version 4 (IPv4) address family. A VPN-IPv4 address is a 12-byte quantity, beginning with an 8-byte Route Distinguisher (RD) and ending with a 4-byte IPv4 address. A RD is simply a number and its purpose is solely to allow creation of distinct routes to a common IPv4 address prefix. In FIG. 5, the three PEs 508A-508C distribute their learned VPN-IPv4 routes to each other by means of iBGP connections between them, provided that the three PEs 508A-508C are in the same autonomous system.

When a PE router distributes a VPN-IPv4 route via iBGP, it uses its own address as the BGP next hop. This BGP next hop address is encoded as a VPN-IPv4 address with a RD of 0. The PE router also assigns and distributes an multiprotocol label switching (MPLS) label. In other words, PE routers distribute labeled VPN-IPv4 routes instead of plain VPN-IPv4 routes.

Each PE 508A-508C maintains a number of separate forwarding tables. One of these forwarding tables is the Default Forwarding Table, and the other forwarding tables are VPN Routing and Forwarding Tables (VRFs). Typically, a separate PE/CE attachment circuit is associated with each VRF. When an IP packet is received over a particular attachment circuit, its destination IP address is looked up in the associated VRF. The result of that lookup determines how to route the packet. The received packet is then labeled and forwarded to its egress PE. When the egress PE processes a received packet with a VPN label, the PE will pop the label and then process the packet appropriately. In the BGP multiprotocol extensions for BGP/MPLS IP VPN, the NLRI is an MPLS-labeled VPN-IPv4.

Figure 6:
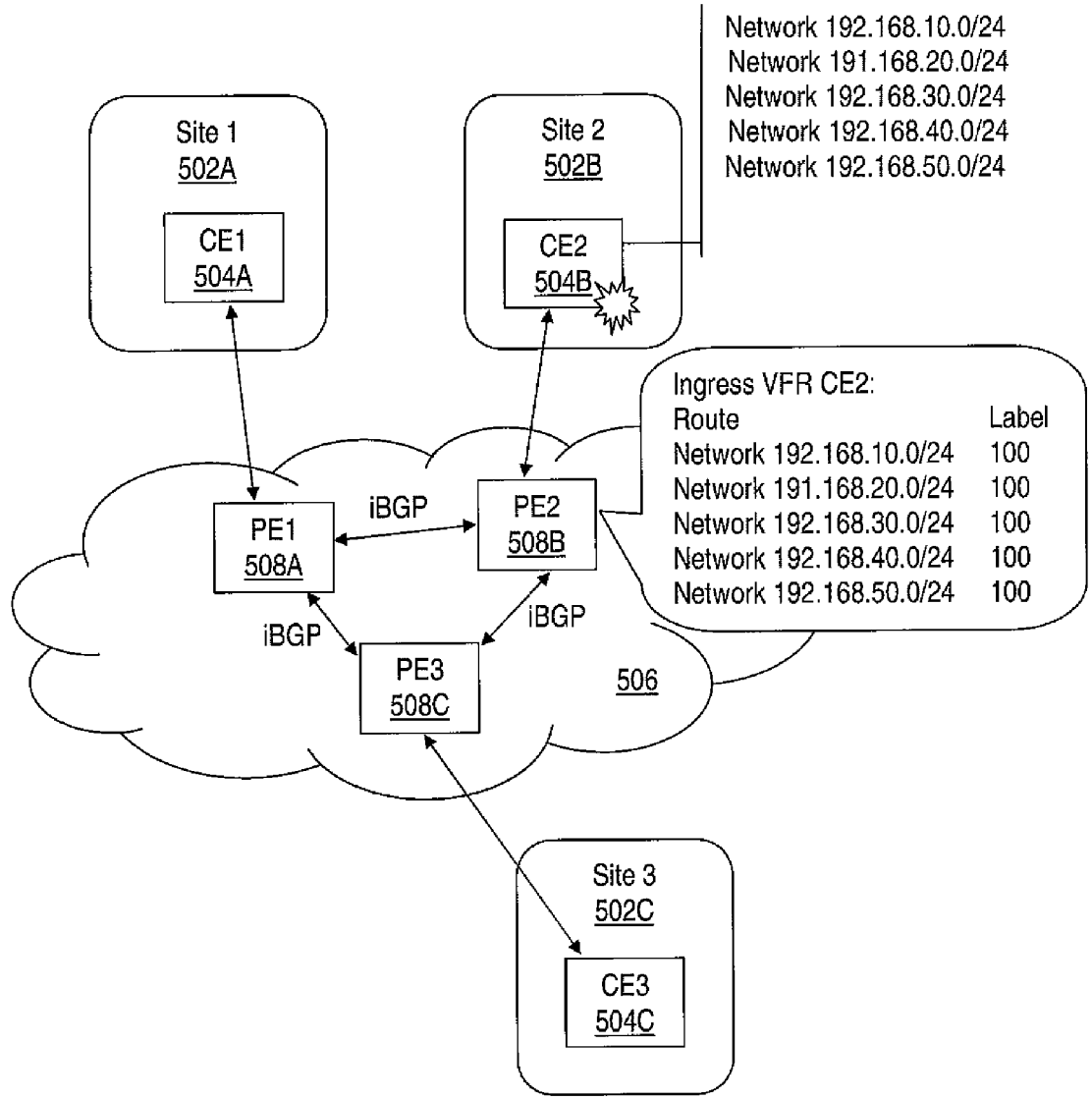
FIG. 6 illustrates a VPN in accordance with an embodiment of the disclosure.

In FIG. 6, PE2 508B is configured to build up an ingress VRF for an associated attachment circuit PE2/CE2 (not shown). After PE2 508B receives the routes from CE2 504B, PE2 508B builds up labeled VPN-IPv4 routes in its ingress VRF and then distributes them to PE1 508A and PE3 508C. In this example, PE2 508B receives five VPN-IPv4 routes from CE2 504B. In the BGP multiprotocol extension, all five routes will be encoded as a path attribute called Multiprotocol Reachable NLRI (MP_REACH_NLRI).

Figure 7A:
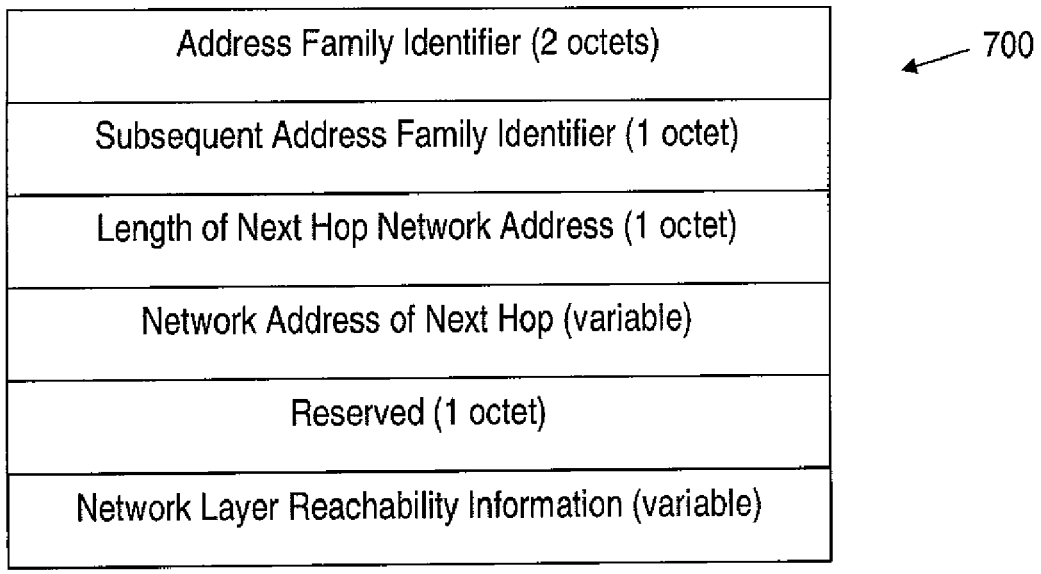
FIGS. 7A, 7B, and 7C illustrate routing protocol formats in accordance with an embodiment of the disclosure.
Figure 7B:
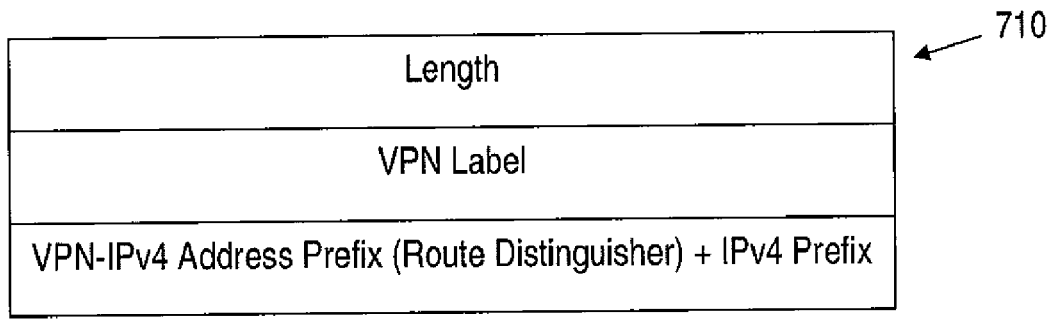
Figure 7C:
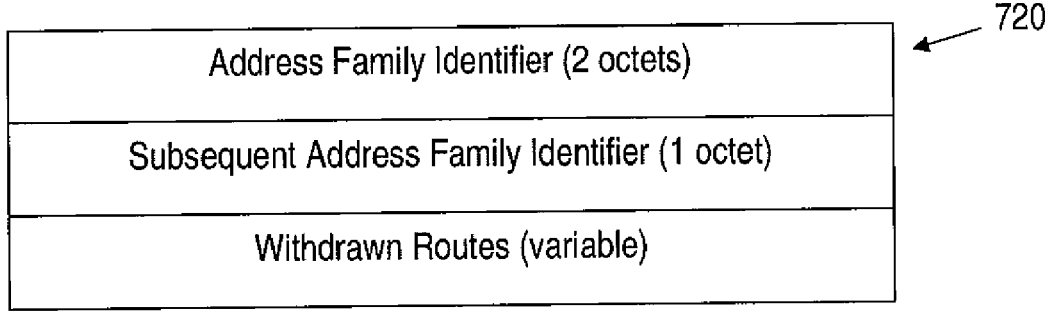

FIGS. 7A, 7B, and 7C illustrate routing protocol formats in accordance with an embodiment of the disclosure. In FIG. 7A, a Multiprotocol Reachable NLRI (MP_REACH_NLRI) path attribute format 700 is illustrated. As shown, the MP_REACH_NLRI path attribute format 700 comprises an address family identifier, which may be two octets in length. Further, the MP_REACH_NLRI path attribute format 700 comprises a subsequent address family identifier (one octet in length) and a length of next hop network address (one octet in length). Further, the MP_REACH_NLRI path attribute format 700 may comprise a network address of next hop, where the network address has a variable length. Further, the MP_REACH_NLRI path attribute format 700 may comprise a reserved field (one octet in length) and a NLRI field that is variable in length.

The labeled VPN-IPv4 NLRI itself is encoded in the format 710 shown in FIG. 7B. In the format 710, a length field, a VPN label, and VPN-IPv4 address prefix (route distinguisher) plus an IPv4 prefix are provided.

As PE2 508B receives more VPN addresses from CE2 504B, the total length of the path attribute MP-REACH-NLRI increases. As needed, a PE can withdraw a previously advertised route by using a path attribute Multiprotocol Unreachable NLRI (MP-UNREACH_NLRI). FIG. 7C shows a MP-UNREACH_NLRI path attribute format 720 in accordance with an embodiment of the disclosure. As shown, the MP-UNREACH_NLRI path attribute format 720 comprises an address family identifier, which may be two octets in length. Further, the MP-UNREACH_NLRI path attribute format 720 comprises a subsequent address family identifier, which may be one octet in length. Further, the MP-UNREACH_NLRI path attribute format 720 comprises a withdrawn routes field, which may vary in length.

To reduce the overhead of processing previously announced routes in MP-UNREACH-NLRI, PEs implement a new capability to support group-based multiprotocol reachable NLRI withdrawal and new path attributes for the group withdrawal of multiprotocol reachable NLRI. For example, in at least some embodiments, BGP will be extended such that PE2 508B sends an OPEN message to PE1 508A and/or PE3 508C to establish a connection. In each OPEN message, a new capability, MP-GROUP-WITHDRAWAL-CAPABLE, is encoded. If PE1 508A and/or PE3 508C does not support the new capability, a notification is sent to PE2 508B. Thereafter, a connection may be established between PE2 508B and the non-capable BGP without the MP-GROUP-WITHDRAWAL-CAPABLE capability.

In the following example, PE2 508B and its BGP peer supports the new capability. After PE2 508B receives routes from CE2 504B, PE2 508B builds an ingress VRF for the VPN attached from the PE2-CE2 attachment circuit. Then PE2 508B announces routes to PE1 508A using a new path attribute, Multiprotocol Grouped Reachable NLRI (MP-GROUP-REACH-NLRI).

Figure 8A:
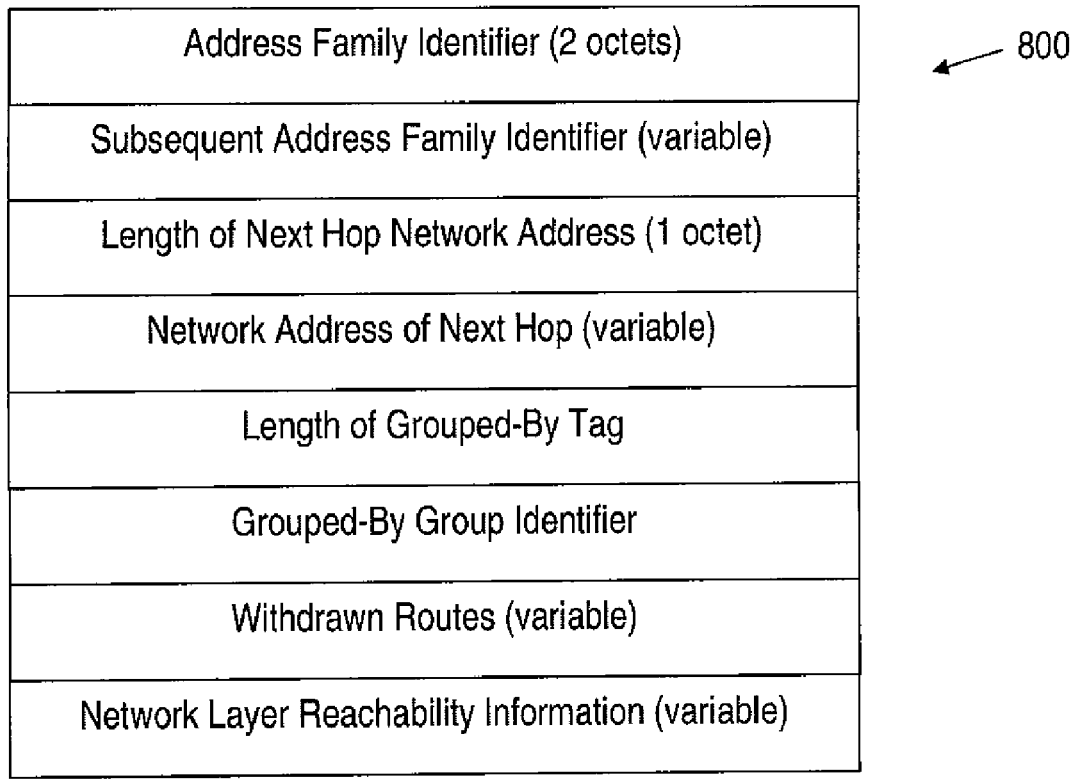
FIGS. 8A, 8B, and 8C illustrate routing protocol formats in accordance with an embodiment of the disclosure.
Figure 8B:
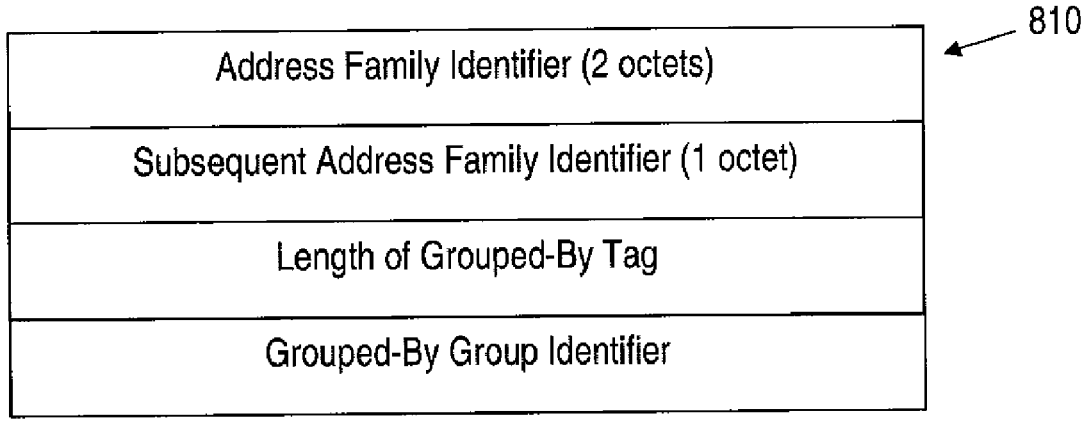
Figure 8C:
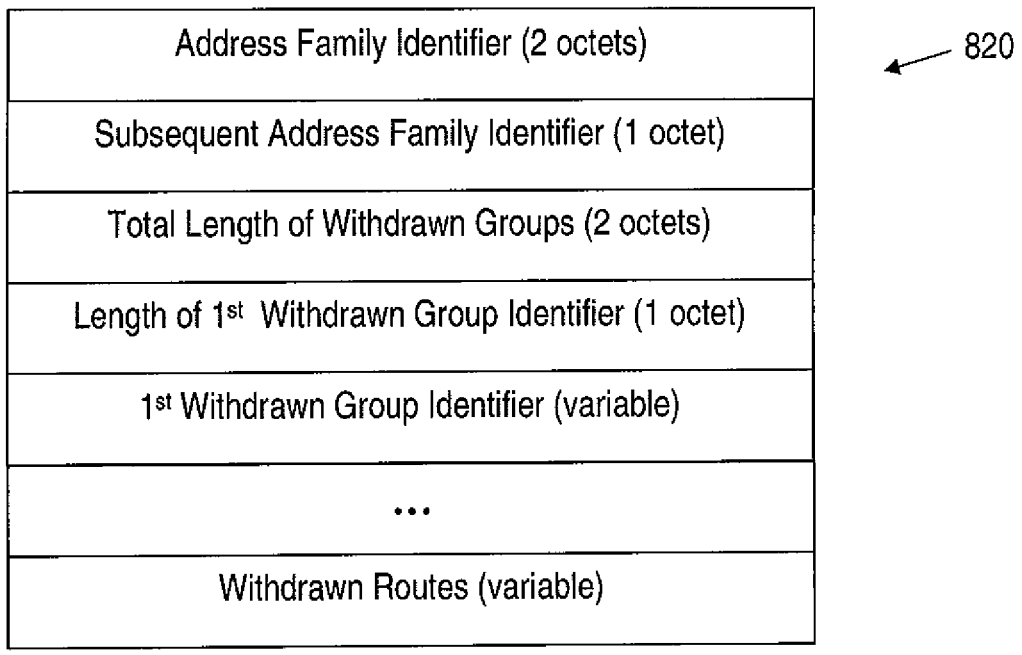

FIGS. 8A, 8B, and 8C illustrate routing protocol formats in accordance with an embodiment of the disclosure. More specifically, FIG. 8A illustrates a format 800 for the MP-GROUP-REACH-NLRI path attribute. As shown, the format 800 is similar to the path attribute format 700, except that the format 800 for the MP-GROUP-REACH-NLRI path attribute adds new tags "Length of Grouped-By" and "Grouped-By Group Identifier." In general, the Grouped-By identifier can be any address of any address family to indicate where the route is received from. Alternatively, the Grouped-By identifier can be any label to identify a group to which a particular route belongs.

When CE2 502B is shut down, instead of encoding every route received from CE2 502B, PE2 508B will simply send an UPDATE message in which there is a group withdrawal attribute referred to a multiprotocol grouped unreachable NLRI ("MP-GROUP-UNREACH-NLRI"). FIG. 8B shows a format 810 for the MP-GROUP-UNREACH-NLRI path attribute. As shown, the format 810 comprises an address family identifier (two octets), a subsequent address family identifier (one octet), a length of the grouped-by tag, and a grouped-by group identifier. Further, the MP-GROUP-UNREACH-NLRI path attribute format 810 can be combined with other explicit unreachable route information. FIG. 8C shows a format 820 for other explicit unreachable route information. As shown, the format 820 comprises an address family identifier (two octets), a subsequent address family identifier (one octet), a total length of withdrawn groups (two octets), a length of first withdrawn group identifier (one octet), a first withdrawn group identifier (variable length), and withdrawn routes (variable length). When PE1 508A receives such a path attribute, PE1 508A will remove all routes with the group identifier tag specified in the path attribute MP-TAGGED-UNREACH-NLRI.

In the case of BGP multiprotocol extension, the new capability MP-GROUP-WITHDRAWAL-CAPABLE is encoded in OPEN messages as an optional parameter. Further, the new path attributes MP-GROUP-REACH-NLRI and MP-GROUP-UNREACH-NLRI are encoded in UPDATE messages as path attributes.

Figure 9:
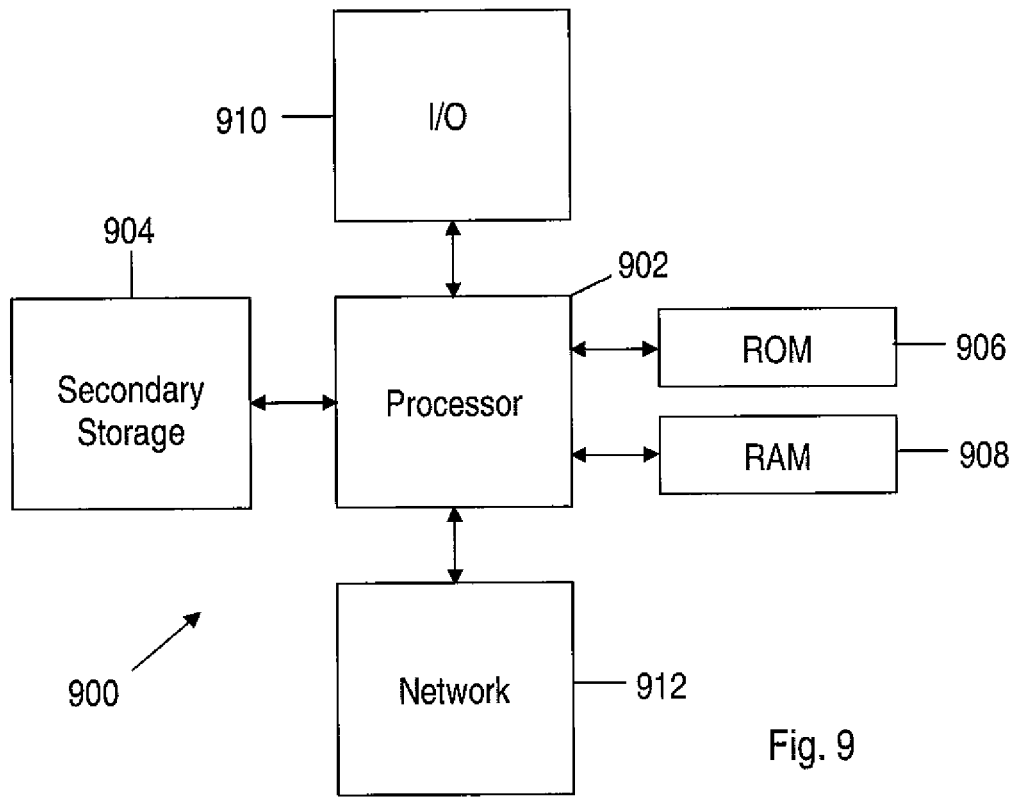
FIG. 9 is a schematic diagram of an embodiment of a general-purpose computer system.

The grouped route withdrawal techniques described herein may be implemented on any general-purpose network component, such as a computer or network component with sufficient processing power, memory resources, and network throughput capability to handle the necessary workload placed upon it. FIG. 9 illustrates a typical, general-purpose network component suitable for implementing one or more embodiments of the components disclosed herein. The network component 900 comprises a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor 902 may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims.

Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a first Border Gateway Protocol (BGP) device configured to;
communicate with a second BGP device and implement grouped route withdrawals with the second BGP device, wherein the second BGP device is an internal BGP peer of the first BGP device;
receive a route from a third BGP device, wherein the third BGP device is an external BGP peer of the first BOP device;
tag the route using an extended community identifier, wherein the extended community identifier identifies a group to which the route belongs;
transmit an UPDATE message to the second BGP device, wherein the UPDATE message comprises the extended community identifier and the route; and
in response to the third BGP device being shut down, withdraw all routes in the group using the extended community identifier.

2. The apparatus of claim 1, wherein the first BGP device is further configured to transmit an OPEN message with a grouped route withdrawal capability indicator to the second BGP device.

3. The apparatus of claim 1, wherein the first BGP device is further configured to transmit an OPEN message with a multiprotocol grouped route withdrawal capability indicator to the second BGP device.

4. The apparatus of claim 1, wherein the extended community identifier comprises an IP address of a BGP speaker that announces a route between two autonomous systems.

5. The apparatus of claim 1, wherein the first BGP device is further configured to transmit an UPDATE message to the second BGP device, and wherein the UPDATE message comprises a path attribute that indicates a group tag for removal of all routes associated with the group tag.

6. The apparatus of claim 1, wherein the second BGP device is configured to:
receive an UPDATE message with a grouped route withdrawal indicator fix a group of routes; and
remove the same group of all tagged routes previously received from the first BGP device, recalculate best paths, and then operate in accordance with standard BGP.

7. The apparatus of claim 1, wherein the first BGP device is further configured to use Multi-Protocol BGP (MP-BGP) and add a path attribute to a message to tag multiprotocol reachable network layer reachability information (NLRI) with a group identifier.

8. The apparatus of claim 7, wherein the first BGP device is further configured to communicate a path attribute in a NLRI to the second BGP device to indicate removal of all routes tagged with a previously announced group identifier.

9. The apparatus of claim 1, wherein the first BGP device is Anther configured to implement Layer-3 VPN, and wherein a Layer-3 VPN route is encoded in a multiprotocol reachable network layer reachability information (NLRI) path attribute in which a corresponding customer edge (CE) address is used as a group identifier.

10. The apparatus of claim 1, wherein the first BGP device directly connects to a customer edge (CE) router and, if the CE router is shut down, a multiprotocol unreachable network layer reachability information (NLRI) path attribute is sent to other provider edge routers from the first BGP device which directly connects to the CE router.

11. The apparatus of claim 10, wherein provider edge routers that receive a multiprotocol unreachable NLRI path attribute remove all virtual private network (VPN) routes associated with a group tag contained in the multiprotocol unreachable NLRI path attribute.

12. A method of implementing grouped route withdrawls between a first Border Gateway Protocol (BGP) device and a second BGP device, wherein the second BGP device is an internal BGP peer of the first BGP device, the method comprising:
receiving a route from the third BGP device, wherein the third BGP device is an external BGP peer of the first BGP device;
tagging, by the first BGP device, the route using an extended community identifier, wherein the extended community identifier identifies a group to which the route belongs;
transmitting an UPDATE message to the second BGP device, wherein the UPDATE message comprises the extended community identifier and the route; and
in response to the third BGP device being shut down, withdrawing, by the first BGP device, all routes in the group using the extended community identifier.

13. The method of claim 12 further comprising negotiating grouped route withdrawal capability between the first BGP device and the second BGP device.

14. The apparatus of claim 1, wherein the first BGP device is further configured to send an UPDATE message to the second BGP device to remove all routes tagged with the extended community identifier.

15. The method of claim 12, further comprising sending an UPDATE message to the second BGP device to remove all routes tagged with the extended community identifier.

* * * * *

UNITED STATES PATENT AND TRADEMARK OFFICE
CERTIFICATE OF CORRECTION

PATENT NO.         : 8,391,303 B2
APPLICATION NO.    : 12/753941
DATED              : March 5, 2013
INVENTOR(S)        : Renwei Li It is certified that error appears in the above-identified patent and that said Letters Patent is hereby corrected as shown below:

In the Claims:

Column 11, Lines 32-50, printed claim 1, should read as:
1. An apparatus comprising:
    a first Border Gateway Protocol (BGP) device configured to:
    communicate with a second BGP device and implement grouped route withdrawals with the second BGP device, wherein the second BGP device is an internal BGP peer of the first BGP device;
    receive a route from a third BGP device, wherein the third BGP device is an external BGP peer of the first BGP device;
    tag the route using an extended community identifier, wherein the extended community identifier identifies a group to which the route belongs;
    transmit an UPDATE message to the second BGP device, wherein the UPDATE message comprises the extended community identifier and the route; and
    in response to the third BGP device being shut down, withdraw all routes in the group using the extended community identifier.

Column 12, Lines 19-24, printed claim 9, should read as:
9. The apparatus of claim 1, wherein the first BGP device is further configured to implement Layer-3 VPN, and wherein a Layer-3 VPN route is encoded in a multiprotocol reachable network layer reachability information (NLRI) path attribute in which a corresponding customer edge (CE) address is used as a group identifier.

Signed and Sealed this
Fourteenth Day of May, 2013

Teresa Stanek Rea
*Acting Director of the United States Patent and Trademark Office*